United States Patent

Cromer et al.

[11] Patent Number: 6,027,121
[45] Date of Patent: Feb. 22, 2000

[54] COMBINED BRUSH/LABYRINTH SEAL FOR ROTARY MACHINES

[75] Inventors: Robert Harold Cromer, Johnstown; Bharat S. Bagepalli, Schenectady; Norman Arnold Turnquist, Cobleskill; Christopher Edward Wolfe, Niskayuna, all of N.Y.

[73] Assignee: General Electric Co., Schenectady, N.Y.

[21] Appl. No.: 08/956,686

[22] Filed: Oct. 23, 1997

[51] Int. Cl.$^7$ .................................................. F16J 15/447
[52] U.S. Cl. .......................................... 277/347; 277/355
[58] Field of Search .................................. 277/347, 350, 277/355, 409, 412

[56] References Cited

U.S. PATENT DOCUMENTS

| | | |
|---|---|---|
| 768,593 | 8/1904 | Emmet et al. . |
| 779,785 | 1/1905 | Junggren . |
| 910,472 | 1/1909 | Junggren . |
| 957,887 | 5/1910 | Junggren . |
| 980,282 | 1/1911 | Junggren . |
| 1,352,277 | 9/1920 | Junggren . |
| 1,352,278 | 9/1920 | Junggren . |
| 1,505,647 | 8/1924 | Junggren . |
| 1,505,924 | 8/1924 | Warren . |
| 1,536,014 | 4/1925 | Junggren . |
| 1,594,838 | 8/1926 | Kégresse . |
| 1,651,855 | 12/1927 | Warren . |
| 1,670,071 | 5/1928 | Junggren . |
| 1,895,930 | 1/1933 | Junggren . |
| 2,336,323 | 12/1943 | Warren . |
| 2,600,991 | 6/1952 | Hargrove . |
| 2,709,338 | 5/1955 | Morley et al. . |
| 3,186,168 | 6/1965 | Ormerod et al. . |
| 3,463,498 | 8/1969 | Bill . |
| 3,759,038 | 9/1973 | Scalzo et al. . |
| 4,195,476 | 4/1980 | Wood . |
| 4,202,554 | 5/1980 | Snell . |
| 4,281,838 | 8/1981 | Persson . |
| 4,358,120 | 11/1982 | Moore . |
| 4,415,309 | 11/1983 | Atterbury . |
| 4,422,288 | 12/1983 | Steber . |
| 4,541,741 | 9/1985 | Woodbridge et al. . |
| 4,567,730 | 2/1986 | Scott ........................... 60/752 X |
| 4,580,346 | 4/1986 | Reichl . |
| 4,730,876 | 3/1988 | Werner et al. . |
| 4,756,536 | 7/1988 | Belcher . |
| 4,781,388 | 11/1988 | Wörhl et al. . |
| 4,785,623 | 11/1988 | Reynolds . |
| 4,809,990 | 3/1989 | Merz . |

(List continued on next page.)

FOREIGN PATENT DOCUMENTS

| | | |
|---|---|---|
| 0453315 A1 | 10/1991 | European Pat. Off. . |
| 2 438 214 | 4/1980 | France . |
| 2 650 048 | 1/1991 | France . |
| 2938-484 | 3/1981 | Germany . |
| 421302 | 5/1947 | Italy . |
| 3-209068 | 9/1991 | Japan . |
| 1 541 001 | 2/1979 | United Kingdom . |
| 2 191 825 | 12/1987 | United Kingdom . |
| 2 214 998 | 9/1989 | United Kingdom ............... 277/355 |
| 2 301 635 | 12/1996 | United Kingdom . |
| WO92/05378 | 4/1992 | WIPO . |

OTHER PUBLICATIONS

Positive Pressure Variable Clearance Packing, Morrison et al.,; GE Turbine Reference Library, May 1990.

*Primary Examiner*—Lynne H. Browne
*Assistant Examiner*—Greg Binda
*Attorney, Agent, or Firm*—Nixon & Vanderhye

[57] ABSTRACT

A labyrinth brush seal combination for a rotating machine comprising an arcuate segment of predetermined axial extent carrying a plurality of axially spaced, circumferentially and radially extending tapered seal teeth, and at least one circumferentially extending array of discrete bristles carried by the segment at a predetermined axial location therealong and projecting beyond the radial extent of the teeth, the bristles having an elongated, flexible carrier strip slidably and removably received within a slot in the segment.

12 Claims, 4 Drawing Sheets

U.S. PATENT DOCUMENTS

| | | |
|---|---|---|
| 4,901,522 | 2/1990 | Commaret et al. .................... 60/39.32 |
| 4,971,336 | 11/1990 | Ferguson . |
| 4,989,886 | 2/1991 | Rulis . |
| 5,002,288 | 3/1991 | Morrison et al. . |
| 5,026,252 | 6/1991 | Hoffelner . |
| 5,029,875 | 7/1991 | Spain et al. . |
| 5,029,876 | 7/1991 | Orlando et al. . |
| 5,066,025 | 11/1991 | Hanrahan . |
| 5,074,748 | 12/1991 | Hagle . |
| 5,076,590 | 12/1991 | Steinetz et al. . |
| 5,090,710 | 2/1992 | Flower . |
| 5,106,104 | 4/1992 | Atkinson et al. . |
| 5,110,033 | 5/1992 | Noone et al. . |
| 5,114,159 | 5/1992 | Baird et al. . |
| 5,135,237 | 8/1992 | Flower . |
| 5,174,582 | 12/1992 | Ferguson . |
| 5,176,389 | 1/1993 | Noone et al. . |
| 5,181,728 | 1/1993 | Stec . |
| 5,181,827 | 1/1993 | Pellow et al. . |
| 5,183,197 | 2/1993 | Howe . |
| 5,192,084 | 3/1993 | Norbury . |
| 5,201,530 | 4/1993 | Kelch et al. . |
| 5,316,318 | 5/1994 | Veau . |
| 5,318,309 | 6/1994 | Tseng et al. . |
| 5,335,920 | 8/1994 | Tseng et al. . |
| 5,351,971 | 10/1994 | Short . |
| 5,374,068 | 12/1994 | Jewett et al. . |
| 5,400,586 | 3/1995 | Bagepalli et al. . |
| 5,401,036 | 3/1995 | Basu . |
| 5,474,305 | 12/1995 | Flower . |
| 5,474,306 | 12/1995 | Bagepalli et al. . |
| 5,480,165 | 1/1996 | Flower . |
| 5,503,405 | 4/1996 | Jewett et al. . |
| 5,509,780 | 4/1996 | Synfelt . |
| 5,524,340 | 6/1996 | Galbraith et al. . |
| 5,597,167 | 1/1997 | Snyder et al. . |
| 5,599,026 | 2/1997 | Sanders et al. . |
| 5,630,590 | 5/1997 | Bouchard et al. . |
| 5,678,898 | 10/1997 | Bagepalli et al. . |
| 5,749,584 | 5/1998 | Skinner et al. .................... 415/173.5 X | ns
COMBINED BRUSH/LABYRINTH SEAL FOR ROTARY MACHINES

TECHNICAL FIELD

This invention relates to turbo machinery in general and more specifically, to combined labyrinth/brush seals for steam and gas turbines.

BACKGROUND

Rotary machines, such as steam and gas turbines, used for power generation and mechanical drive applications are generally large machines consisting of multiple turbine stages. High pressure fluid flowing through the turbine stages must pass through a series of stationary and rotating components, and seals between the stationary and rotating components are used to control leakage. The efficiency of the turbine is directly dependent on the ability of the seals to prevent leakage, e.g., between the rotor and stator.

Turbine designs are conventionally classified as either an impulse (with the majority of the pressure drop occurring across fixed nozzles) or a reaction (with the pressure drop more evenly distributed between the rotating and stationary vanes) type. Both designs employ sharp, rigid teeth, known as labyrinth seals to control leakage. Traditionally, labyrinth seals of either a hi-lo (alternating teeth height) or straight shaft design are used. Such seals are employed at virtually all turbine locations where leakage between rotating and stationary components must be controlled. These include interstage shaft seals, rotor end seals, and bucket (or blade) tip seals. While labyrinth seals have proved to be quite reliable, their performance degrades over time as a result of transient events in which the stationary and rotating components interfere, rubbing the labyrinth teeth into a "mushroom" profile and opening the seal clearance.

Another type of seal used in many environments, including rotary machines, is a brush seal. Brush seals are generally less prone to leakage than labyrinth seals. A brush seal can also accommodate relative radial movement between fixed and rotational components, for example, between a rotor and a stator, because of the flexure of the seal bristles. Brush seals also generally conform better to surface non-uniformities. The result of using brush seals is better sustained rotary machine performance than is generally possible with labyrinth seals.

The combining of brush seals with labyrinth seals for turbine applications is disclosed in commonly owned pending application Ser. Nos. 08/672,665 filed Jun. 28, 1996 and 08/719,667 filed Sep. 25, 1996. The subject matter of these applications is incorporated herein by reference.

Brush seals disclosed in the '665 and '667 applications comprise bristle packs secured between a pair of rigid plates, with the bristles welded to the plates. The plates are precisely machined to fit within a stationary annular groove (the brush seals typically include four segments which, when installed, create a 360° seal). As such, individual brush seals are designed for one particular diameter groove. In the field of industrial/turbo machinery, however, several different diameter seals may be required which nevertheless perform substantially identical functions. Accordingly, different tooling is required for each small diameter change, significantly increasing the cost of such seals.

DISCLOSURE OF THE INVENTION

In accordance with a preferred embodiment of the present invention, unique brush seal segments are provided which have great flexibility with respect to seal diameter and which significantly reduce the cost of the seals.

In accordance with an exemplary embodiment of this invention, brush bristles are mounted in a flexible holder in the form of an elongated, stainless steel channel which is crimped to the bristles. This arrangement allows simple and cost effective manufacture of essentially continuous lengths of the bristle portion of the brush seal, regardless of the ultimate diameter of the seal.

The brush portion, cut into appropriate segment lengths, is then slidably installed within T-shaped slots machined, for example, in labyrinth seal segments, adjacent one of the rigid labyrinth teeth which supports the bristles. The T-shaped slots are machined to the required diameter, and the separately manufactured brush portion can be cut to the segment lengths and pushed into the slots, with the flexible channel conforming to the curvature of the slot. In the exemplary embodiment, the brush portions with flexible holder may be secured within respective segment slots by set screws or other suitable means.

The significant advantage of this invention is that the brush arrangement including the flexible top component can be manufactured separately in a cost-effective manner, and then installed within various diameter T-slots cut into the labyrinth segments, stator, or other stationary machine components.

Accordingly, in its broader aspects, the present invention relates to a labyrinth brush seal combination for a rotating machine comprising an arcuate segment of predetermined axial extent carrying a plurality of axially spaced, circumferentially and radially extending tapered seal teeth, and at least one circumferentially extending array of discrete bristles carried by the segment at a predetermined axial location therealong and projecting beyond the radial extent of the teeth, the bristles secure to an elongated, first flexible carrier strip slidably and removably received within an arcuate slot in the arcuate segment.

In another aspect, the invention relates to a rotary machine comprising a rotatable component; a fixed component surrounding the rotatable component; the components lying about a common axis; a labyrinth seal between the fixed and rotatable components comprising a plurality of seal segments, each segment including a plurality of axially spaced circumferentially extending teeth projecting radially toward the rotatable component; each labyrinth seal segment including at least one brush seal comprising an array of discrete bristles carried by the fixed component for disposition axially adjacent at least one of the teeth; wherein the discrete bristles are mounted to a first elongated, flexible carrier strip and wherein the strip is slidably received within an arcuate slot formed in the segment whereby the brush seal conforms to the curvature of the segment.

Other advantages of the subject invention will become apparent from the detailed description which follows.

BEST MODE FOR CARRYING OUT THE INVENTION

Figure 1:
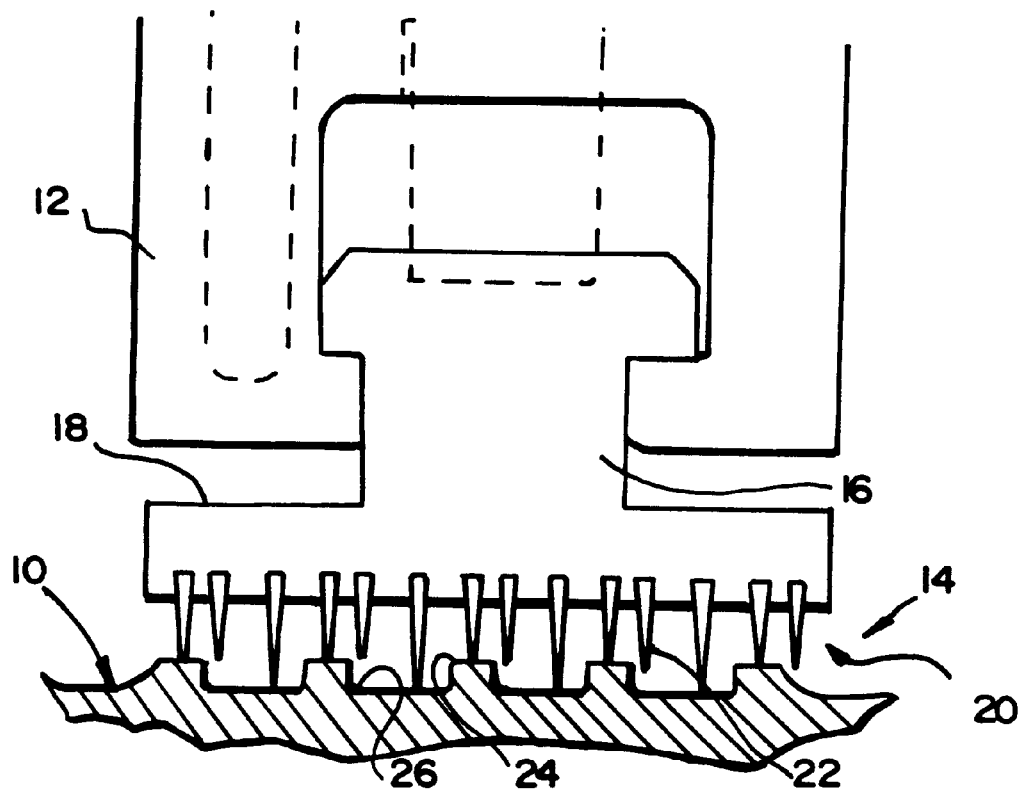
FIG. 1 is a schematic illustration of a conventional labyrinth sealing ring segment.

Referring now to the drawing figures, particularly to FIG. 1, there is illustrated a portion of a conventional rotary machine, for example, a steam turbine, having a turbine shaft 10 disposed in a turbine housing 12 and which shaft 10 is supported by conventional means, not shown, within the turbine housing 12. A labyrinth seal, generally designated 14, located between the rotating shaft 10 and the stationary housing 12, includes a seal ring 16 disposed about shaft 10 separating high and low pressure regions on axially opposite sides of the ring. It will be appreciated that while only one seal 16 is disclosed, typically multiple-stage labyrinth seals are provided about rotor shafts. Each seal ring 16 is formed of an annular array (usually four or more) arcuate seal elements 18 having sealing faces 20 and a plurality of radially projecting, axially spaced teeth 22. The teeth as shown are of a hi-lo design for obtaining close clearances with the radial projections or ribs 24 and the grooves 26 of the shaft 10. The labyrinth seal functions by placing a relatively large number of barriers, i.e., the teeth, to the flow of fluid from a high pressure region to a low pressure region on opposite sides of the seal, with each barrier forcing the fluid to follow a tortuous path whereby pressure drop is created. The sum of the pressure drops across the labyrinth seal is by definition the pressure difference between the high and low pressure regions on axially opposite sides thereof. These labyrinth seal ring segments are typically spring-backed and are thus free to move radially when subjected to severe rotor/seal interference. In certain designs, the springs maintain the seal ring segments 16 radially outwardly away from the rotor, for example, during startup and shutdown, with fluid pressure being supplied between the seal ring segments and the rotor housing to displace the seal ring segments radially inwardly to obtain a less clearance with the rotor, i.e., close the seals, after the rotor has been brought up to speed.

Figure 2:
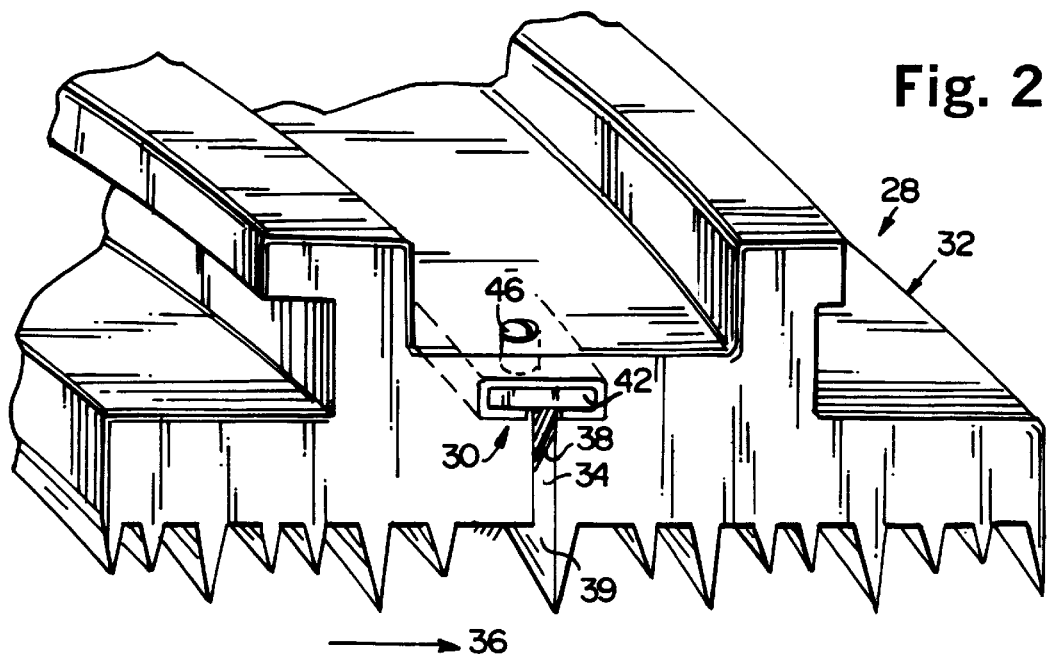
FIG. 2 is a schematic illustration of a combined labyrinth/brush seal in accordance with this invention.
Figure 2A:
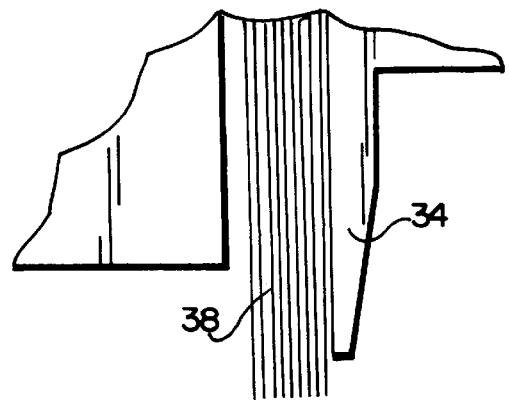
FIG. 2A is an enlarged detail illustrating the brush seal and adjacent labyrinth tooth.

Referring to FIGS. 2 and 2A, there is illustrated in accordance with this invention an example of a combined labyrinth/brush seal 28 incorporated as a retrofit or as original equipment in a labyrinth seal. In this arrangement, a T-shaped groove 30 is formed in the labyrinth seal segment 32, with the stem of the groove located adjacent the centrally located rigid tooth 34. In the direction of flow indicated by arrow 36, the rigid labyrinth tooth 34 lies on the downstream side of the brush seal segment 32 to support the brush bristles 38 in the axial direction.

Figure 3:
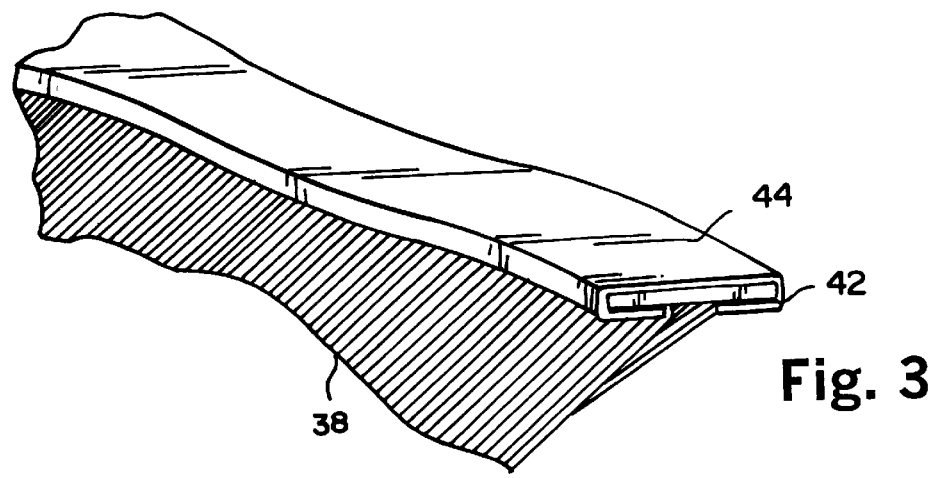
FIG. 3 is a partial perspective of a length of brush seal in accordance with an exemplary embodiment of the invention.
Figure 4:
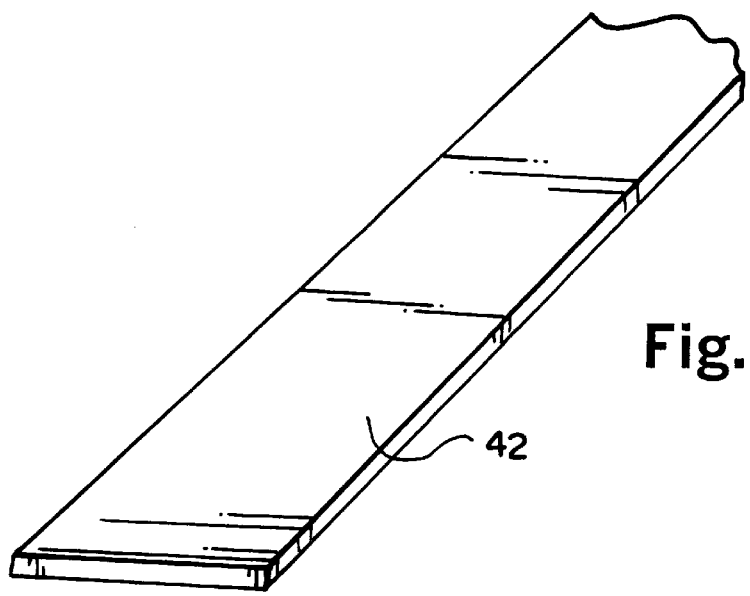
FIG. 4 is a partial perspective of an elongated shim incorporated into the brush seal of FIG. 3.
Figure 5:
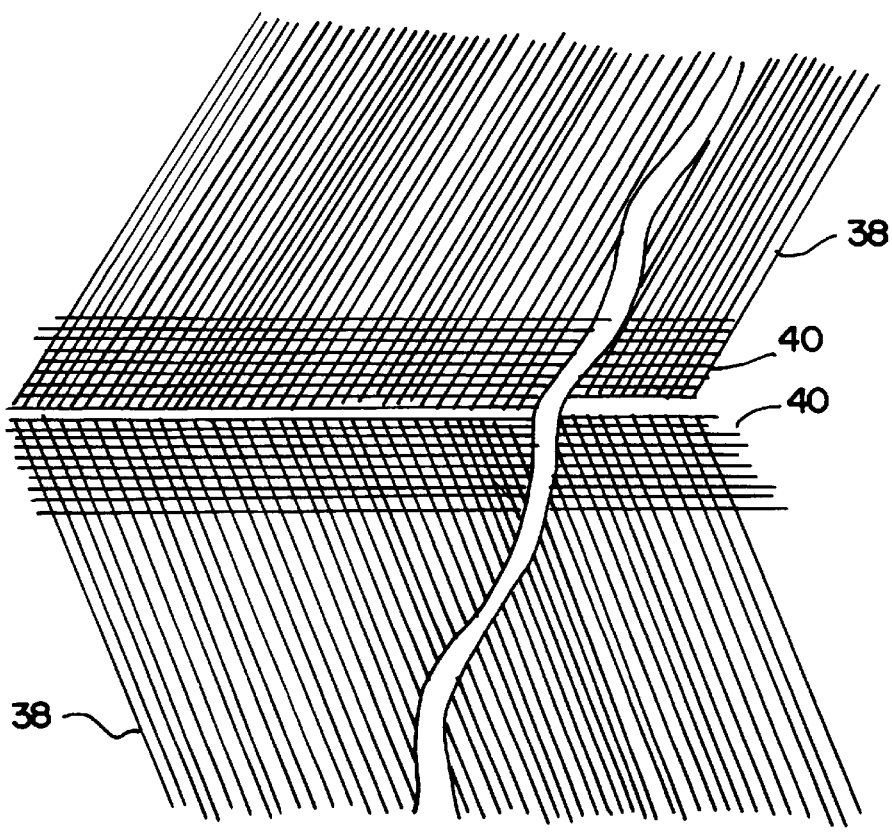
FIG. 5 is a partial side elevation of brush bristles canted at a 45° in accordance with the invention.
Figure 6:
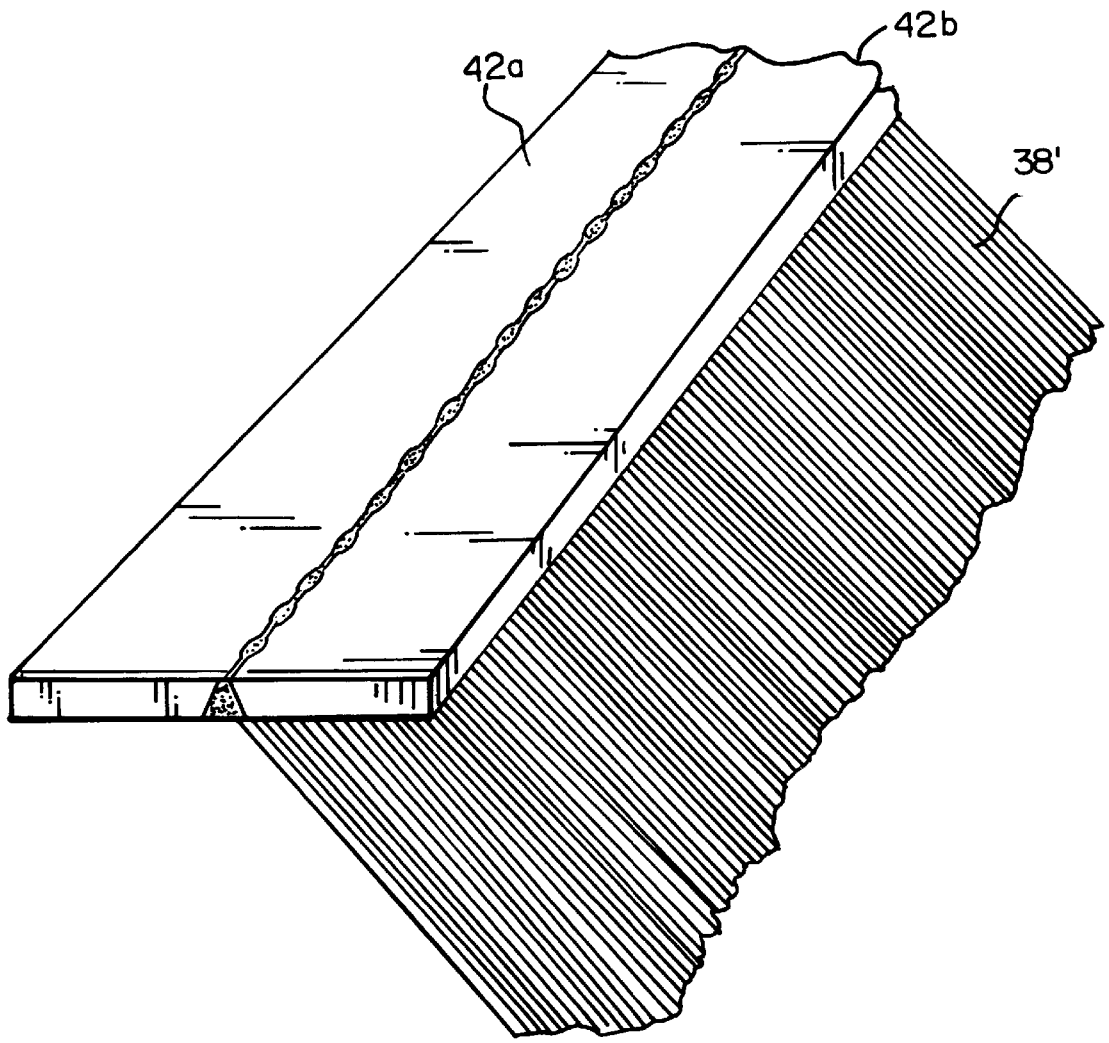
FIG. 6 is a partial perspective view of an elongated shim and brush seal in accordance with another embodiment of the invention.

The bristles 38 (best seen in FIGS. 3 and 5) of this new seal are comprised of conventional brush seal material, e.g., wires of Haynes 25 stainless steel. Other alloys may be appropriate, however, for specific applications. The stiff wire bristles are arranged in two or more layers, and canted at a 45° angle to a radial line passing through a longitudinal axis of the shaft or rotor 10 best seen in FIGS. 2, 3 and 6. Along the fold line, the bristles are held together by woven fibers 40, such that the bristles may be folded over a thin (e.g., 10 mils), flexible metal strip (e.g., stainless steel) or shim 42 best seen in FIG. 4, with the woven fibers 40 extending along the top of the shim 42. After the bristles are folded over the shim, another thin (about 20 mils) flexible strip 44 (also stainless steel) is crimped about the shim as shown in FIGS. 2 and 3 to complete the seal assembly. It is preferred that the shim 42 and strip 44 not be particularly elastic, so that when bent (as described below), they do not have a tendency to spring back to a straighter shape. It is also possible that the bristles 38 of each layer of bristles may be welded directly to the shim, eliminating the need for the woven cross fibers 40. See, for example, FIG. 6 where bristles 38 are welded to and between a pair of shim strips 42a and 42b.

It will be appreciated that the brush seal per se can be manufactured in essentially endless or continuous form, independent of any diameter groove in which it may be placed. In use, an appropriate length segment is cut from the supply and is pushed into the precisely machined T-slot 30 in a labyrinth seal segment 32. As the segment is pushed into the slot, the flexible seal element easily conforms to the diameter of the slot. After insertion, set screws (one shown at 46) or other suitable means may be employed to lock the brush component radially in place within the slot 30. The set screw also prevents any circumferential migration of the brush component within the slot.

In the preferred arrangement, the next adjacent labyrinth tooth 34 on the low pressure side of the brush seal provides lateral support for the bristles 38 as described above. As best seen in FIG. 2, because of the 45° canting of bristles 38, a blank triangular area 39 appears at the end of each segment. Tooth 34 nevertheless continues to effect a degree of sealing at this location.

In addition, the length of the bristles 38 need not be cut to precise tolerances since they will essentially wear quickly to the required length if initially cut to a slightly greater length than required (see FIG. 2A), as a result of contact with the rotor. By so constructing the seal element, the cost has been significantly reduced, particularly because the seal is adaptable to any diameter and little is required in terms of close tolerances.

It will also be appreciated that the location of the brush component in the labyrinth seal may be varied, and that the number of brush components within the seal may be varied as well.

While the invention has been described in connection with what is presently considered to be the most practical and preferred embodiment, it is to be understood that the invention is not to be limited to the disclosed embodiment but, on the contrary, is intended to cover various modifications and equivalent arrangements included within the spirit and scope of the appended claims.

What is claimed is:

1. A labyrinth/brush seal combination for a rotating machine comprising a plurality of arcuate segments which together form an annular seal, each segment having a predetermined curvature and a predetermined axial length including a plurality of axially spaced, circumferentially and radially extending seal teeth, and at least one circumferentially extending array of discrete bristles carried by said segment at a predetermined axial location therealong and projecting beyond the radial extent of said teeth, said bristles held within a first, elongated carrier strip and folded over a second elongated carrier strip, with said first elongated carrier strip crimped about said second elongated carrier strip, said first and second elongated carrier strips slidably and removably received within an arcuate slot in said segment, said first and second elongated carrier strips being sufficiently flexible to allow them to be pushed into said arcuate slot and conform to said curvature of said segment.

2. A labyrinth brush seal combination according to claim 1 wherein said bristles are woven together about a fold line.

3. A labyrinth brush seal combination according to claim 1 wherein said bristles are oriented at about a 45° angle relative to a radial line passing through a rotor axis of said rotary machine.

4. The combination of claim 1 wherein said array of discrete bristles lie closely adjacent one of said plurality of axially spaced, circumferentially and radially extending seal teeth, on an upstream side thereof.

5. The combination of claim 1 wherein said first flexible carrier strip is comprised of stainless steel.

6. The combination of claim 1 wherein said second flexible carrier strip is comprised of stainless steel.

7. The combination of claim 1 wherein said slot is substantially T-shaped, including a stem and a transverse section, wherein said flexible carrier strip lies in said transverse section.

8. A rotary machine comprising:
a rotatable component;
a fixed component surrounding said rotatable component;
said components lying about a common axis;
a labyrinth seal between said fixed and rotatable components comprising a plurality of seal segments, each segment have a predetermined curvature and including a plurality of axially spaced circumferentially extending teeth projecting radially toward said rotatable component;
each labyrinth seal segment including at least one brush seal comprising an array of discrete bristles carried by said fixed component for disposition axially adjacent at least one of said teeth; wherein said discrete bristles are held within a first flexible carrier strip and attached to a second flexible carrier strip, with said first flexible carrier strip crimped about said second flexible carrier strip, said first and second elongated flexible carrier strips being sufficiently flexible to allow them to be pushed into said arcuate slot so as to conform to said curvature of said segment.

9. The rotary machine of claim 8 wherein said at least one brush seal lies approximately mid-way along an axial extent of said segments, and wherein an adjacent labyrinth tooth provides lateral support for said at least one brush seal.

10. The rotary machine of claim 9 wherein said carrier strip comprises stainless steel.

11. The rotary machine of claim 9 wherein said carrier strip extends laterally of said bristles and wherein said arcuate slot is substantially T-shaped in section.

12. The rotary machine of claim 8 wherein the bristles are welded to said second carrier strip.

* * * * *